United States Patent [19]

Graser, Jr.

[11] 3,945,731

[45] Mar. 23, 1976

[54] COLOR CONTROL SYSTEM FOR OPTICAL IMAGE APPARATUS

[75] Inventor: Michael Graser, Jr., Bedford, Mass.

[73] Assignee: Technical Operations, Incorporated, Boston, Mass.

[22] Filed: Aug. 1, 1974

[21] Appl. No.: 493,697

[52] U.S. Cl. ............... 356/178; 250/205; 250/226; 350/162 SF; 356/190
[51] Int. Cl.² .......................................... G01J 3/50
[58] Field of Search ................ 250/204, 205, 226; 356/175, 178, 190, 186; 350/162 F

[56] References Cited
UNITED STATES PATENTS

| | | | |
|---|---|---|---|
| 3,454,775 | 7/1969 | Gibbs | 250/205 X |
| 3,805,065 | 4/1974 | Williams | 250/205 |

OTHER PUBLICATIONS

*Machine Design*, Sept. 24, 1964, pp. 148 and 149.

*Primary Examiner*—John K. Corbin
*Assistant Examiner*—F. L. Evans
*Attorney, Agent, or Firm*—Alfred H. Rosen; Frank A. Steinhilper

[57] ABSTRACT

In an optical apparatus of the Fourier transform type employing a plurality of individual light sources arrayed about the optical axis of the apparatus, a control subsystem for all the light sources samples light from the light sources selectively. In the illustrated embodiment, a pellicle deflects a minor fraction of the source light to a spatial filter which passes a selected sample or samples to a group of spectrally filter photodiodes, which respond with currents that are fed to a photometric circuit and means to display measured quantities to an operator. The apparatus includes operator controllable means to adjust the intensity of each supervised light source independently of the others. A primary light source, from which the individual light sources are derived, is also supervised, to provide a basis for taking into account variations in energizing voltage, and dimming of the primary source with age.

12 Claims, 3 Drawing Figures

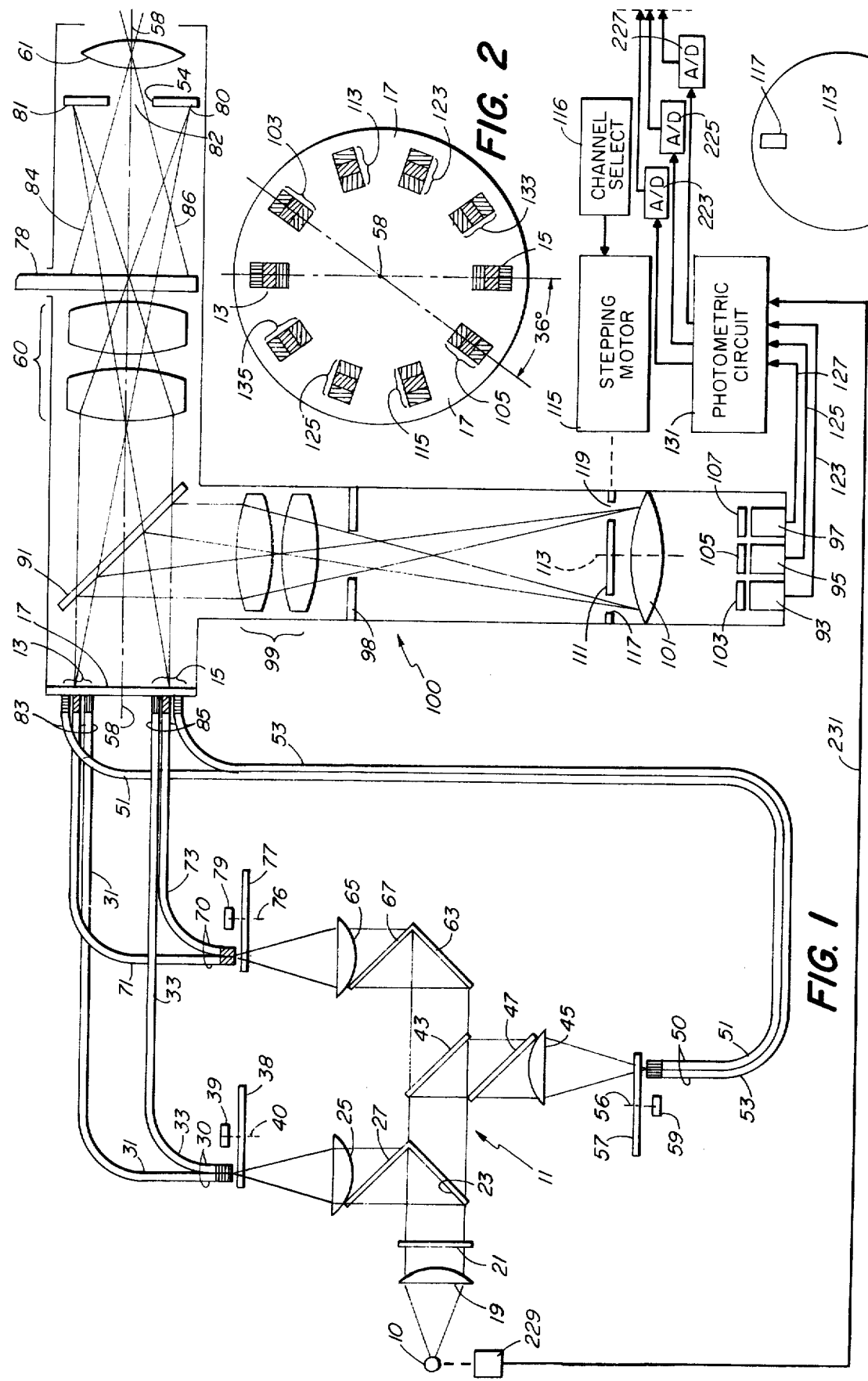

3,945,731

COLOR CONTROL SYSTEM FOR OPTICAL IMAGE APPARATUS

CROSS-REFERENCE TO RELATED PATENTS AND APPLICATIONS

This invention relates generally to optical image reconstruction apparatus of the kind that is described in U.S. Pat. Nos. 3,561,859 and 3,549,238, and may incorporate the improvement of application Ser. No. 433,903 filed Jan. 16, 1974, now U.S. Pat. No. 3,884,553 all of which are owned by the assignee of the present application. It relates more particularly to apparatus that is useful to perform methods and to construct colored images from records that are described and claimed in application Ser. No. 399,367 filed Sept. 21, 1973. Generally, such apparatus comprises an optical viewing or display apparatus having an optical axis, means for supporting on the axis a record of one or more component record images each modulating a spatial carrier characterized by a unique orientation relative to the carriers of the other components, and light-source means for illuminating the record with light beams effectively emanating from a plurality of angularly separated sources, there being one or a pair of such effective light sources for each of said component record images. The source or pair of sources for each such component is or are angled obliquely to the axis, and aligned azimuthally with respect to the carrier orientation of said such component, so as to locate a predetermined harmonic diffraction spectrum of said component on the optical axis in a Fourier transform space.

BRIEF DESCRIPTION OF THE DRAWINGS

FIG. 1 is a schematic illustration of an optical system with monitor/control sub-system according to the invention;

FIG. 2 is a plan view of the light sources in the optical system; and

FIG. 3 is a plan view of the spatial filter used in the monitor/control sub-system.

BACKGROUND OF THE INVENTION

To construct colored images as above-related in a controllable or repeatable fashion, it is useful for an operator to have means to measure the properties of the light being used. Employing light sources that have prescribed spectral components, it is useful to be able to measure and to control the intensity of each spectral component of each light source. Preferably the measurement should be able to be done without interrupting normal operation of the optical image reconstruction apparatus. The present invention provides these benefits, and the additional benefit, should it be desired, of normalizing the individual light sources for variations in the voltage employed to energize the light source or sources, as well as for dimming of the light source or sources with age.

DETAILED DESCRIPTION OF THE DRAWINGS

In FIG. 1 a single optical subassembly 11 provides a source of red, green and blue light components to a pair of diametrically-opposed off-axis light sources 13 and 15, respectively, located in a transform filter 17 of a reconstruction apparatus of the kind described in the referenced patents. The optical axis of the reconstruction apparatus is along line 58—58. White light from the principal light source, lamp 10, passes through a first condenser lens 19 and a heat filter 21 to a first spectral filter 23 (preferably dichroic) which reflects blue light to a second condenser lens 25 through a blue trim filter 27. The first and second condenser lenses 19 and 25 form a first condenser system for focusing the blue light component on a first bundle 30 of two light conductors 31 and 33 through a circular variable neutral-density wedge in the form of disc 38 that is rotatable on a shaft 40 by means of a motor 39. The wedge 38 has a density which varies with angular displacement around the shaft 40, the functional relationship between density and angular position being a matter of choice for the designer of particular apparatus. The two light conductors 31 and 33 may be grouped side-by-side as shown, or may be random-mixed at the bundle 30.

Light that passes through the first spectral filter 23 next encounters a second spectral filter 43 which reflects red light to a third condenser lens 45 through a red trim filter 47. The first and third condenser lenses 19 and 45 form a second condenser system for focusing the red light component on a second bundle 50 of two light conductors 51 and 53 through a second circular neutral-density wedge in the form of a disc 57 which is rotatable on a shaft 56 by means of a motor 59.

Light that passes through the second spectral filter 43 next encounters a mirror, preferably incorporating a third spectral filter 63, which reflects green light to a fourth condenser lens 65 through a green trim filter 67. The first and fourth condenser lenses 19 and 65 form a third condenser system for focusing the green light component on a third bundle 70 of two light conductors 71 and 73 through a third circular neutral-density wedge in the form a disc 77 which is rotatable on a shaft 76 by means of a motor 79. The second and third bundles 50 and 70 can also be made of side-by-side or random-mixed groupings of fibers.

A first blue light conductor 31, a first green light conductor 71 and a first red light conductor 51 are brought together in a first trifurcated bundle 83 to form a first one 13 of the pair of off-axis light sources 13, 15. A second blue light conductor 33, and a second green light conductor 73 and a second red light conductor 53 are brought together in a second trifurcated bundle 85 to form the second one 15 of these two off-axis light sources.

Each off-axis light source 13, 15 in the illustrated diametrically-opposed pair is located in the transform filter assembly 17 so as to deposit a first-order (or other desired-order) diffraction spectrum in the aperture stop 54 of the reconstruction apparatus when used to demodulate a modulated image stored in a suitable record 78, provided the record contains modulation which bears the proper azimuthal orientation for both sources and has appropriate spatial periodicity. The reconstruction apparatus includes as components known from the referenced patents a transform lens assembly 60, a projection lens 61 and the aperture stop 54. The record 78 bearing a spatially modulated stored image may be located on the far side of the transform lens from the transformer filter. It is assumed for the purposes of this illustration (i.e. in FIG. 1) that the record 78 bears a diffraction grating modulation the lines of which are directed normal to the drawing. With this arrangement, as is known, zero-order diffracted light from each light source 13, 15 will be directed to fall outside the aperture of the stop 54, for example at a position 80, 81, respectively, and a first-order diffraction pattern from each source 13, 15 will fall in the stop 54 at a region 82 as is represented by lines 84, 86.

Using the arrangement shown in FIG. 1, several optical subassemblies, for example, five like the one shown, can be arrayed around the lamp 10, to provide four additional pairs of diametrically opposed off-axis light sources 103, 105; 113, 115; 123, 125; and 133, 135; arrayed around the optical axis 58 in the transform filter assembly 17, as is shown in FIG. 2. Each such pair will constitute the input light to a separate optical channel, and can be used to illuminate a uniquely spatially modulated record image; and each uniquely modulated image can be illuminated and reconstructed separately from or simultaneously with one or more of the others. Each such light source can be spaced azimuthally the same amount from its neighbors, in which case the angle between adjacent pairs of light sources will be 36°, in the illustrated example. Advantageously, according to the invention of the above-referenced application Ser. No. 433,903 filed Jan. 16, 1974, each light source in the transform filter 17 for the reconstruction system is comprised of a radially distributed array of colored light sources. An array of three colored sources — red, green and blue, with the red located radially farthest from the optical axis 58 and the blue nearest to the axis — is a preferred example. This array is fixed relative to the optical axis, each color being uniquely located as determined by the diffraction grating spatial periodicity in the record 78 and optical parameters of the reconstruction apparatus. The input ends of a trifurcated bundle of light conductors (e.g., 83, 85) which receive the individually colored light inputs are physically separate from each other, so that each may be coupled to a separate source of spectrally filtered light, as appears in FIG. 1. Using this technique, a plurality of off-axis light sources can be provided, each of which can be made to provide light of any desired hue or color at an optimum radial distance from the optical axis 58, 58 of the modulated-image reconstruction system employing them. Neutral density variable-density light filters (e.g., 38, 57, 77) are employed to attenuate to any desired degree the light of any one or more spectral components of each individual off-axis light source.

A beam splitter pellicle 91 located in the light path from the off-axis light sources 13, 15, etc., to the transform lens assembly 60 diverts out of that path a small amount of light, for example, 5 to 10% of the light that is incident upon it from the light sources, to an array of photo-detectors 93, 95 and 97, via a relay lens assembly 99, a stop 98, a channel select filter 111, and a field lens 101, to provide a color monitor or control sub-system 100 for the display system. The photodetectors may be photodiodes. Each is provided with a narrow-band color filter 103, 105, 107, respectively. The spectral bandwidth of each filter is limited, in the present example, to one of the primary colors red, blue or green, and each filter will pass only one of the primary colors and substantially block the other two, so that each photodiode is able to receive only light in a prescribed band, that is, light of one of these three primary colors.

The channel-select filter 111 is a spatial filter that is shown in plan view in FIG. 3. It comprises an opaque disc-shaped body having in it two radially extending rectangular apertures 117, 119 diametrically opposed near opposite edges of the disc and corresponding in shape and location to the shape and location of the pair of light sources of any one only of the five channels indicated in FIG. 2; and the disc is rotatable on the optic axis 113 of the subsystem 100 by a stepping motor 115 under control of a channel select station 116. Rotation of the channel select filter 111 on its axis will enable an operator to select the light of only one channel to be passed to the photodetectors 93, 95, 97, blocking light from the other four channels shown.

The photodetectors are connected individually, as is indicated schematically by conductors 123, 125, 127, respectively, to a photometric circuit 131. Each detector senses one of the three primary colors in the channel that is selected to be monitored or controlled, and produces a current having an amplitude that is related to the intensity of the light which is incident upon it, and supplies that current to the photometric circuit. Desirably, functions of that circuit are to amplify each received current and to provide via respective A-to-D converters 223, 225, 227 a digital-form indication of the current amplitude for display to an operator of the apparatus. The operator may also control (via the channel select station 116) the stepping motor 115, to select the channel to be supervised, as well as the motors 39, 59, 79 which are employed to rotate on their respective axes the neutral density filters (e.g., 38, 57, 77) in each channel.

A lamp-sense detector 229, which may be a photodiode, located near the lamp 10, produces a current proportional to lamp brightness which is applied to the photometric circuit 131 over conductor means 231. This current is used to normalize the primary color light signals, to compensate for lamp brightness variations due to changes in line voltage, and for lamp dimming due to age. This compensation enables the photometric circuit consistently to measure and display chromaticity values substantially free of error due to variability in the source brightness.

The illustrated embodiment of the invention is preferred primarily because it enables the color monitor sub-assembly to be used without interrupting use of the principal image reconstruction apparatus. Light from all the channels (e.g., the five channels shown in FIG. 2) can be used simultaneously to create an image from the record 78, while at the same time light from any one channel is being examined in the monitor sub-assembly 100 by means of the channel select filter 111. A simpler arrangement, requiring fewer optical components, might be to locate the channel select filter 111 and the photodetectors 93, 95, 97 with their respective color filters 103, 105, 107 in the optical path 58—58 of the reconstruction apparatus, between the transform filter 17 and the transform lens assembly 60. That arrangement would prevent simultaneous use of all the light channels to reconstruct an image from the record 78, and it would therefore be desirable to provide means to remove the monitor components from the optical path 58—58 when not needed and to reinsert those components into that path for monitor use when desired. Obviously, an arrangement involving the locating of any of the monitor components in the optical path 58—58 of the reconstruction apparatus will limit use of the reconstruction system during monitor or control functions, whereas in the preferred embodiment that is illustrated uninterrupted use of the reconstruction system and the monitor or control functions can be performed simultaneously.

The respective connections from the photometric circuit 131 to each of the A-to-D converters 223, 225, 227, may include an amplifier (not shown) of prescribed properties, such as linear or non-linear, to provide a specified response characteristic. The output signals from the A-to-D converters may be in the form of ratios, relating the current amplitude from each photodetector 93, 95, 97 to the current amplitude from the lamp-sense detector 229.

I claim:

1. In an optical apparatus employing a plurality of individual light channels each having one or more light sources, means to supervise said sources comprising means to sample light from each source, means to present the samples of light from all said sources in unison in a spatial array in a prescribed location, spatial filter means in said location operable to pass light from a selected one of said channels while blocking light from the remaining ones of said channels, photometric means disposed to receive light passed by said filter means, means to operate said filter means to pass light from a selected one of said channels to said photometric means, and means to provide from each sample a signal that is related to the intensity of said sample.

2. An optical apparatus according to claim 1 employing a plurality of individual light sources that are disposed in a prescribed spatial array around an axis of the apparatus, said spatial filter means being rotatable on an axis to pass light from a selected one of said channels while blocking light from the remaining ones of said channels, and means to rotate said filter means on its axis to pass light from a selected one of said channels to said photometric means.

3. In an optical apparatus according to claim 1, a plurality of individual light sources each of which is comprised of at least two spectral components, and means to provide from each spectral component of each sample a signal that is related to the intensity of said component.

4. Optical apparatus according to claim 2 comprising spatial filter means operable to pass all the spectral components of light from a selected one of said channels while blocking all the light from the remaining ones of said channels, photometric means comprising individual photoreceptor means for each of said spectral components, and means to operate said spatial filter means to pass all the spectral components of light from a selected one of said channels to said photometric means.

5. Optical apparatus according to claim 3 including means to adjust the intensity of each spectral component of each light source independently of all other spectral components of all said sources.

6. Apparatus according to claim 3 including a primary source of white light, means to separate said white light into said spectral components, means to form each of said individual light sources from a group of individual ones of said spectral components, and means to adjust the intensity of each of said individual spectral components independently of all the other individual spectral components.

7. Apparatus according to claim 6 including photometric means to supervise the intensity of said white light, and means to relate each of said signals to the intensity of said white light.

8. Apparatus according to claim 3 including a primary source of white light, means to separate said white light into said spectral components, means to form each of said individual light sources from a group of said spectral components, photometric means to supervise the intensity of said white light, and means to relate each of said signals to the intensity of said white light.

9. In an optical apparatus according to claim 4, photometric means including spectral filter means disposed to receive separately each spectral component of the light passed by said spatial filter means, means to operate said spatial filter means to pass all the spectral components of light from a selected one of said channels to said photometric means, and means to provide from each spectral component of the light reaching said photometric means a signal that is related to the intensity of said component.

10. In an optical apparatus employing a plurality of individual light channels each having one or more light sources that are disposed in a prescribed array around and radially spaced from a first axis for directing light generally along said first axis to an optical component located on said axis, means to supervise said sources comprising partial reflector means between said sources and said optical component to divert in unison a fraction of said light from each source into a second axis that is directed away from said optical component, means to present the samples of light from all said sources in unison in a spatial array in a prescribed location, spatial filter means in said location rotatable on said second axis to pass diverted light from a selected one of said channels while blocking diverted light from the remaining ones of said channels, photometric means disposed to receive diverted light passed by said filter means, and means to rotate said filter means on said second axis to pass diverted light from a selected one of said channels to said photometric means.

11. In an optical apparatus employing a plurality of individual light channels each having one or more light sources that are disposed in a prescribed array around a first axis for directing light generally along said first axis to an optical component located on said axis, each of said sources being comprised of at least two spectral components which are displaced side by side along a radius originating in and extending transversely to said first axis, means to supervise said sources comprising partial reflector means between said sources and said optical component to divert in unison a fraction of said light from each source into a second axis that is directed away from said component while passing to said component in unison the remaining light from each of said sources, spatial filter means comprising an opaque disc that is rotatable on said second axis, said disc having a radially oriented aperture means in at least one location for passing diverted light from all the spectral components of a selected one of said channels while blocking substantially all the diverted light from the remaining ones of said channels, photometric means including spectral filter means disposed to receive separately each spectral component of the light passed by said disc, means to rotate said disc on said second axis to pass all the spectral components of light diverted from a selected one of said channels to said photometric means, and means to provide from each spectral component of the light reaching said photometric means a signal that is related to the intensity of said spectral component.

12. Apparatus according to claim 11 including a primary source of light, means to derive said individual light sources from said primary source, means to supervise the intensity of said primary source, and means to relate each of said signals to the intensity of said primary source.

* * * * *